US009968886B2

(12) United States Patent
Balenovic et al.

(10) Patent No.: US 9,968,886 B2
(45) Date of Patent: May 15, 2018

(54) DUAL CATALYST HEATING SYSTEM (71) Applicant: Ford Global Technologies, LLC, Dearborn, MI (US)

(72) Inventors: Mario Balenovic, Waalre (NL); Felix Goebel, Aachen (DE); Matthew Allen Schneider, Aachen (DE); Martina Reichert, Aachen (DE); Frederik De Smet, Genk (BE); Peter Ross, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/228,590

(22) Filed: Aug. 4, 2016

(65) Prior Publication Data
US 2017/0037799 A1  Feb. 9, 2017

(30) Foreign Application Priority Data

Aug. 5, 2015 (DE) .................. 10 2015 214 906

(51) Int. Cl.
*F02D 41/26* (2006.01)
*B01D 53/94* (2006.01)
(Continued)

(52) U.S. Cl.
CPC ....... *B01D 53/9418* (2013.01); *F01N 3/0842* (2013.01); *F01N 3/2006* (2013.01);
(Continued)

(58) Field of Classification Search
CPC ...... B01D 53/9418; B01D 2255/20723; B01D 2255/808; B01D 2255/91; B01D 2255/50;
(Continued)

(56) References Cited

U.S. PATENT DOCUMENTS 7,886,529 B2 * 2/2011 Gonze .................... F01N 3/027
60/274
8,475,574 B2 * 7/2013 Gonze .................... F01N 3/027
422/169
(Continued)

FOREIGN PATENT DOCUMENTS

DE   102008030307 A1   12/2009
EP      2256312 A1      12/2010
(Continued)

OTHER PUBLICATIONS

Balenovic, Mario, et al., "Exhaust Tract Having a Metering Device Which Sprays Counter to a Direction of Flow, Method for Operating an Exhaust Tract and Vehicle Having an Exhaust Tract," U.S. Appl. No. 15/199,121, filed Jun. 30, 2016, 25 pages.

*Primary Examiner* — Hai Huynh
(74) *Attorney, Agent, or Firm* — Julia Voutyras; McCoy Russell LLP (57) ABSTRACT

Methods and systems are provided for an exhaust gas aftertreatment system for a combustion engine in a motor vehicle. In one example, the exhaust gas aftertreatment comprises at least two catalyst devices arranged in an exhaust tract, and a feed device for a reducing agent arranged between the two catalysts, and which furthermore comprises a first heat device at the inlet of the first catalyst and a second heat device downstream thereof, the system adapted for the reduction of nitrogen oxides.

19 Claims, 5 Drawing Sheets (51) Int. Cl.
*F01N 9/00* (2006.01)
*F01N 3/08* (2006.01)
*F01N 3/20* (2006.01)
*F01N 3/28* (2006.01)

(52) U.S. Cl.
CPC ......... *F01N 3/2066* (2013.01); *F01N 3/2892* (2013.01); *F01N 9/00* (2013.01); *B01D 2255/20723* (2013.01); *B01D 2255/20761* (2013.01); *B01D 2255/50* (2013.01); *B01D 2255/808* (2013.01); *B01D 2255/91* (2013.01); *F01N 2510/06* (2013.01); *F01N 2560/06* (2013.01); *F01N 2610/102* (2013.01); *F01N 2900/08* (2013.01); *F01N 2900/1602* (2013.01); *Y02T 10/24* (2013.01); *Y02T 10/26* (2013.01); *Y02T 10/47* (2013.01)

(58) Field of Classification Search
CPC ............ B01D 2255/20761; F01N 9/00; F01N 3/2006; F01N 3/2892; F01N 3/2066; F01N 3/0842; F01N 3/2033; F01N 3/2013; F01N 3/36; F01N 3/208; F01N 3/029; F01N 3/0293; F01N 2610/102; F01N 2610/03; F01N 2900/1602; F01N 2900/08; F01N 2510/06; F01N 2560/06; Y02T 10/24; Y02T 10/47; Y02T 10/26
USPC .......... 123/672, 685, 697; 60/284, 286, 295, 60/299, 300, 303, 320
See application file for complete search history.

(56) References Cited

U.S. PATENT DOCUMENTS

| | | | |
|---|---|---|---|
| 8,479,496 B2 * | 7/2013 | Gonze | F01N 3/027 60/274 |
| 8,661,790 B2 * | 3/2014 | Gonze | F01N 9/00 60/286 |
| 8,726,642 B2 * | 5/2014 | Gonze | F01N 3/027 60/274 |
| 8,950,177 B2 * | 2/2015 | Gonze | F01N 3/027 60/273 |
| 8,973,349 B2 * | 3/2015 | Gonze | F01N 3/0814 60/286 |
| 9,021,793 B2 * | 5/2015 | Kim | F01N 3/0835 60/274 |
| 9,371,760 B2 * | 6/2016 | Hirth | F01N 3/2013 |
| 9,623,376 B2 * | 4/2017 | Hirabayashi | B01D 53/9431 |
| 2009/0064664 A1 * | 3/2009 | Hirata | B01D 53/9431 60/286 |
| 2009/0183501 A1 * | 7/2009 | Gonze | F01N 3/0222 60/303 |
| 2010/0290957 A1 * | 11/2010 | Yoshida | F01N 3/106 422/109 |

FOREIGN PATENT DOCUMENTS

| | | |
|---|---|---|
| JP | H0968032 A | 3/1997 |
| JP | 2015017515 A | 1/2015 |
| WO | 2006100051 A1 | 9/2006 |

* cited by examiner

DUAL CATALYST HEATING SYSTEM

CROSS-REFERENCE TO RELATED APPLICATION

This application claims priority to German Patent Application No. 102015214906.4, filed Aug. 5, 2015, the entire contents of which are hereby incorporated by reference for all purposes.

FIELD

The present invention relates to a system for exhaust gas aftertreatment of a combustion engine in a motor vehicle, having at least two catalyst devices arranged in the exhaust tract, and at least two heating devices, in particular for reducing nitrogen oxides via a reducing agent introduced into the exhaust gas flow.

BACKGROUND AND SUMMARY

Aftertreatment of diesel exhaust gases is used inter alia to reduce the nitrogen oxide content of exhaust gas. One known method for this purpose is "selective catalytic reduction" (SCR). In SCR, nitrogen oxides are reduced to water and nitrogen over a catalyst by the reducing agent ammonia. Conventionally, the ammonia is introduced in the form of a urea solution (e.g., AdBlue) into the exhaust tract ahead of the SCR catalyst. A catalyst is ideally provided for hydrolysis.

If urea solution is introduced into the exhaust tract, ammonia and isocyanuric acid are formed from urea by thermolysis, and then ammonia and carbon dioxide are formed from the isocyanuric acid by hydrolysis.

However, the inventors herein have recognized potential issues with such approaches to the aftertreatment of diesel gases. As an example, the above-discussed methods may require sufficiently high exhaust gas temperatures for the reaction to proceed in an optimum manner. For example, the thermolytic-hydrolytic conversion of the urea-containing reducing agent does not work at low temperatures. Further, the SCR reaction is also temperature-dependent. Below 150° C., there may be virtually no reaction, while an almost 100% reaction takes place above 220° C. Moreover, reaction efficiency depends on the ratio of the various nitrogen oxides. Under conditions with low exhaust gas temperatures, e.g., in urban traffic, conversion efficiency in the SCR catalyst is relatively low. Even when the temperature of exhaust gas released from the engine is high, due to the position of the SCR catalyst downstream of one or more other exhaust catalysts (e.g., as the second or third element in an exhaust tract), thermal energy of exhaust gas may be lost between the combustion engine and the SCR catalyst. As a result, the exhaust reaching the SCR catalyst may not be hot enough.

It is therefore the object of this disclosure to provide a sufficiently high temperature for the decomposition of the reducing agents and the progress of SCR.

A first aspect of the invention relates to a system for exhaust gas aftertreatment of a combustion engine in a motor vehicle comprising, an exhaust tract; a first catalyst device arranged in the exhaust tract, a second catalyst device arranged downstream of the first catalyst device in the exhaust tract; a feed device for injecting a reducing agent arranged in between the first and the second catalyst device; a first heat device arranged at an inlet of the first catalyst device and a second heat device arranged downstream of the first catalyst device; and a control device.

Advantages of this system may include the ability to increase the temperature of the exhaust gas in accordance with the operating situation. As a result, the operation of the catalysts can begin immediately after the starting of the combustion engine. In addition, rear-injection of a urea solution onto a warm surface, such as a rear face of the first catalyst, as opposed to injection further downstream at lower temperatures, increases decomposition of exhaust gas emissions. Further advantageous embodiments of the invention will become apparent from the additional independent claims and dependent claims, the description, the figures and the illustrative embodiments.

In the present application, the term "reducing agent" is also used for a precursor of the reducing agent, e.g., for urea or an aqueous urea solution, even if the actual reducing agent is ammonia formed from urea in a conversion reaction. In other words, the reducing agent is provided indirectly.

The term "catalyst devices" is used to denote technical units which comprise at least one catalyst. It is possible for a plurality of catalysts to be arranged in a catalyst device. For example, parts of the matrix of the catalyst device are coated with a catalytically active layer, for which reason the term "a coating with a catalyst" is also used in this application.

In one example, the first heat device is arranged at the inlet of the first catalyst device. The first heat device is advantageously used to heat the exhaust gas entering the first catalyst device in order to reach the operating temperature of an oxidation catalyst or is used indirectly to heat the SCR catalyst. In this way, exhaust gas at the SCR catalyst may be made sufficiently hot irrespective of a position of the SCR catalyst with reference to other exhaust catalysts in the exhaust tract.

In another example, the first heat device is coated with the oxidation catalyst. By virtue of the necessary temperatures being reached via the first heat device, hydrocarbons and carbon monoxide can be oxidized over the oxidation catalyst within a short time of starting the combustion engine. A lean NOx trap (LNT) may also be arranged in the first catalyst device. The LNT is used to store nitrogen oxides during the operation of the combustion engine with a lean fuel mixture. When the stored nitrogen oxides are released in rich-mixture operation, the nitrogen oxides are released and reduced over the SCR catalyst. An SCR catalyst may be arranged in the first catalyst device, advantageously at the downstream end, i.e. at the outlet.

The second heat device may be arranged at the outlet of the first catalyst device as well. The second heat device is advantageously used to heat the exhaust gas in order to reach the operating temperature of the SCR catalyst or is used directly to heat the SCR catalyst to the operating temperature thereof.

If the second heat device is arranged at the outlet of the first catalyst device, it may be coated with a catalyst for selective catalytic reduction and/or with a hydrolysis catalyst. This arrangement advantageously allows the reduction of nitrogen oxides released from the LNT since the necessary temperature for thermolysis of urea can therefore also be produced for the operation of the SCR catalyst by virtue of the second heat device. Apart from the function of reducing nitrogen oxides, the SCR catalyst also has a hydrolysis function, thus making it possible, for example, to convert urea into ammonia and use it to further reduce nitrogen oxides. A separate hydrolysis catalyst can also be arranged in addition to the SCR coating.

The second heat device can also be situated further downstream, between the first and the second catalyst device. The SCR coating may be applied to the arrangement of the second heat device both in the first catalyst device and in the exhaust tract between the first and the second catalyst device.

In a further example, in the system according to the invention, at least one mixer is arranged between the first and the second catalyst device. The mixer is advantageously used for uniform distribution of reducing agent introduced into the exhaust tract, thus avoiding deposits in the exhaust tract, especially in the case of urea. Furthermore, the mixer enables reducing agent to be fed in at the outlet of the first catalyst unit, thus ensuring that it is available there for reducing nitrogen oxides over the SCR catalyst. In this way, reducing agent may be injected into the first catalyst unit in a rear facing direction, opposite to the direction of exhaust flow through the first catalyst unit.

A second aspect of the invention relates to a motor vehicle having an exhaust system according to the invention described above. The motor vehicle according to the invention thus has a system having an exhaust tract, in which at least one first catalyst device and one second catalyst device, arranged downstream of the first catalyst device, and a feed device for a reducing agent, which is arranged between the two catalyst devices, are arranged, and a control device, in which system a first heating device is arranged at the inlet of the first catalyst device and a second heating device is arranged downstream thereof.

A third aspect of the invention relates to a method for exhaust gas aftertreatment for the reduction of nitrogen oxides by virtue of a system according to the invention, comprising: starting the combustion engine, then switching on the first heating device, then introducing the reducing agent when a first temperature threshold value is reached, and then switching on the second heating device.

The advantages of the method correspond to those of the system according to the invention.

In one example of the method according to the invention, the second heating device is switched off in a further step if a second temperature threshold value is reached. The second temperature threshold value is reached when sufficiently high exhaust gas temperatures for the thermolytic-hydrolytic conversion and SCR function are achieved. In this case, additional heating by virtue of the second heating device may not be necessary.

In yet another example, the first heating device may be switched off if the second heating device is switched on. However, it is also possible for the first heating device to remain switched on while the second heating device is switched on.

BRIEF DESCRIPTION OF FIGURES

The invention is explained in greater detail by means of the figures, of which.

DETAILED DESCRIPTION

Figure 1:
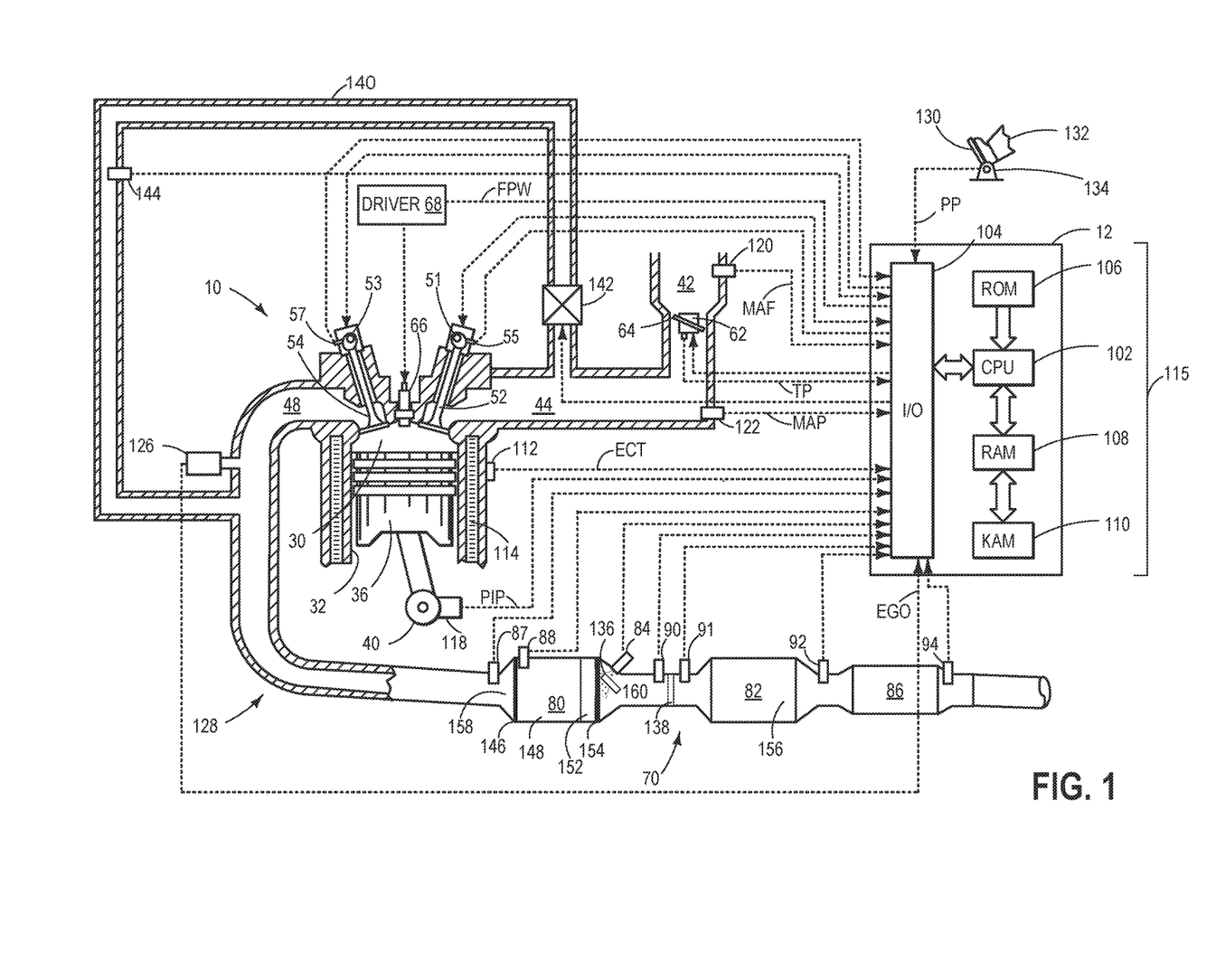
FIG. 1 shows a schematic diagram of an engine.

Referring now to FIG. 1, a schematic diagram is shown with one cylinder of multi-cylinder engine 10, which may be included in a propulsion system of a vehicle. Engine 10 may be controlled at least partially by a control system 115 including a controller 12 and by input from a vehicle operator 132 via an input device 130. In this example, input device 130 includes an accelerator pedal and a pedal position sensor 134 for generating a proportional pedal position signal PP. A combustion chamber (e.g., cylinder) 30 of the engine 10 may include combustion chamber walls 32 with a piston 36 positioned therein. Piston 36 may be coupled to a crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to the crankshaft 40 via a flywheel (not shown) to enable a starting operation of the engine 10.

Combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via intake valve 52 and exhaust valve 54 respectively. In some embodiments, the combustion chamber 30 may include two or more intake valves and/or two or more exhaust valves.

In the example depicted in FIG. 1, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and the exhaust valve 54 may be determined by position sensors 55 and 57, respectively. In alternative embodiments, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

In some embodiments, each cylinder of the engine 10 may be configured with one or more fuel injectors for providing fuel thereto. As a non-limiting example, the cylinder 30 is shown including one fuel injector 66. Fuel injector 66 is shown coupled directly to the cylinder 30 for injecting fuel directly therein. It will also be appreciated that the cylinder 30 may receive fuel from a plurality of injections during a combustion cycle.

In one example, engine 10 may be a diesel engine that combusts air and diesel fuel through compression ignition. In other non-limiting embodiments, engine 10 may be a diesel-hybrid for combustion of different fuel including gasoline, biodiesel, or an alcohol containing fuel blend (e.g., gasoline and ethanol or gasoline and methanol) through compression ignition and/or spark ignition.

The intake passage 42 may include a throttle 62 having a throttle plate 64. In this particular example, the position of the throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by throttle position signal TP. The intake passage 42 may include a mass air flow sensor 120 and a manifold air pressure sensor 122 for providing respective signals MAF and MAP to the controller 12.

Further, an exhaust gas recirculation (EGR) system may route a desired portion of exhaust gas from the exhaust passage 48 to the intake manifold 44 via an EGR passage 140. The amount of EGR provided may be varied by controller 12 via an EGR valve 142. As depicted, the EGR system further includes an EGR sensor 144 which may be arranged within the EGR passage 140 and may provide an indication of one or more of pressure, temperature, and concentration of the exhaust gas.

An exhaust system 128 includes an exhaust gas sensor 126 coupled to the exhaust passage 48 upstream of an exhaust gas treatment system 70. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), NOx, HC, or a CO sensor. The exhaust gas treatment system 70 is shown arranged along the exhaust passage 48 downstream of the exhaust gas sensor 126.

The exhaust gas treatment system 70 may include a plurality of emission control devices. For example, the exhaust gas treatment system 70 may include an inlet 158 leading to a first catalyst device 80 disposed along exhaust gas passage 48. The first catalyst device 80 may further contain a first heat device 146, an oxidation catalyst 148, and an SCR catalyst 152. A second heat device 154 is located in an outlet 160 of the first catalyst device 80. A first mixer 136 may additionally be found in outlet 160, followed by a second mixer 138 along exhaust gas tract 48 downstream of first catalyst device 80. A feed device 84 may be disposed downstream of first catalyst device 80 and upstream of a second catalyst 82. The second catalyst device 82 may be disposed along exhaust gas tract 48 downstream of first catalyst device 80 and include a SCR catalyst 156. A diesel particulate filter (DPF) 86 may be disposed along the exhaust tract downstream of second catalyst 82. In still further examples, a DPF configured with an SCR coating can be provided as the second catalyst 82. For example, the exhaust gas tract may include a Heater-DOC (or LNT)-SCR strip-Heater-SDPF-underfloor SCR configuration. Further details describing the system components of exhaust gas aftertreatment system 70 may be found in FIG. 2 below.

Temperature sensors 87, 88, 90, 92, and 94 and NOx sensor 91 may be disposed at points along the exhaust gas tract 48 both upstream and downstream of each device in the exhaust treatment system 70. As an example, temperature sensor 87, as shown in FIG. 1, may be placed upstream of first catalyst device 80 and may be used to detect the temperature of the exhaust entering first catalyst device 80 through inlet 158. Additional examples describing example sensors may be found in more detail herein.

Engine 10 may further include a control system 115. Control system 115 may contain controller 12, shown in FIG. 1 as a microcomputer, including a microprocessor unit 102, input/output ports 104, an electronic storage medium for executable programs and calibration values shown as a read only memory chip 106 in this particular example, random access memory 108, keep alive memory 110, and a data bus. The controller 12 may be in communication with and, therefore, configured to receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; temperature of the first catalyst device from sensor 88, nitrogen oxides in the exhaust tract from sensor 91, a profile ignition pickup signal (PIP) from a Hall effect sensor 118 (or other type) coupled to the crankshaft 40; throttle position (TP) from a throttle position sensor; absolute manifold pressure signal (MAP), from the pressure sensor 122; and exhaust constituent concentration from the exhaust gas sensors 126. Engine speed signal, RPM, may be generated by controller 12 from signal PIP.

The storage medium read-only memory chip 106 can be programmed with non-transitory, computer readable data representing instructions executable by the microprocessor unit 102 for performing the routines described below as well as other variants that are anticipated but not specifically listed. Example routines are described herein with reference to FIGS. 2-3.

As described above, FIG. 1 shows only one cylinder of a multi-cylinder engine, and each cylinder may similarly include its own set of intake/exhaust valves, fuel injector, etc.

Figure 2:
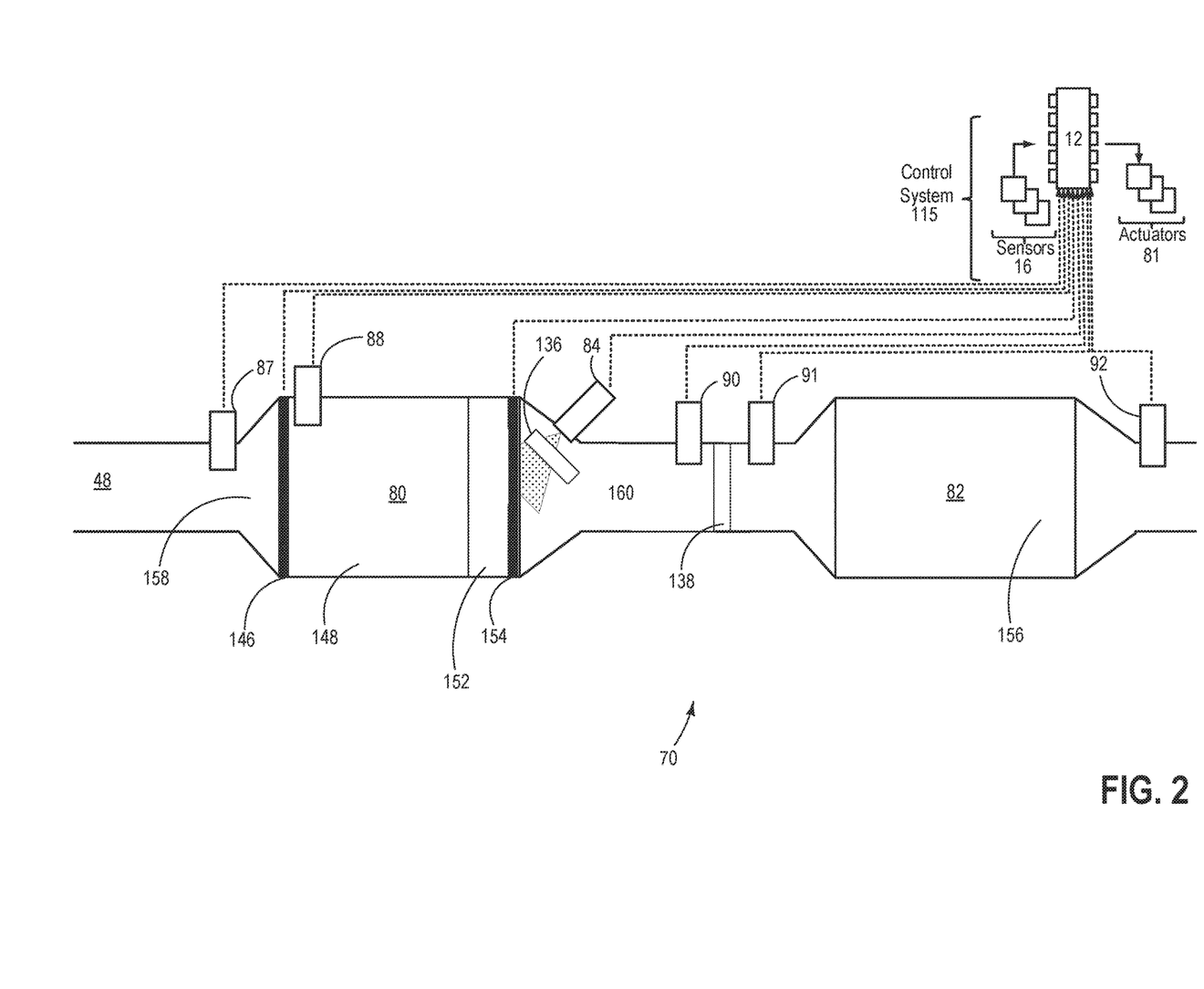
FIG. 2 shows a schematic diagram of an exhaust gas aftertreatment system of the engine.

Turning now to FIG. 2, a schematic diagram of an exhaust gas aftertreatment system 70 in accordance with the engine system of FIG. 1 is shown. The exhaust gas from a combustion engine (not shown) is passed through exhaust tract 48. Ideally, the combustion engine is a self-ignition combustion engine.

First catalyst device 80 is arranged in exhaust tract 48 in the direction of the flow of the exhaust gas. First heat device 146 is arranged at inlet 158 of first catalyst device 80. First heat device 146 is covered by oxidation catalyst 148, i.e., by a corresponding catalytically active coating. Oxidation catalyst 148 is ideally a diesel oxidation catalyst. Oxidation catalyst 148 is placed upstream of a SCR catalyst 152, both located in the first catalyst device. In other examples, an LNT can be used instead of an oxidation catalyst. In embodiments including a strip of SCR in the rear of the first catalyst with an LNT in front advantageously enables the in-situ created NH3 during rich purges to be utilized by the SCR strip.

NOx is produced during combustion of diesel gas and thereby densely concentrated in the resulting exhaust gas emissions. The exhaust gas enters first catalyst device 80 via inlet 158 and flows past oxidation catalyst 148. Where the oxidation catalyst 148 includes a DOC, the catalyst oxidizes NO to NO2 that enhances downstream SCR NOx reduction. In examples where the oxidation catalyst includes an LNT, the catalyst may store and reduce NOx during rich purges. It also creates additional NH3 during rich purges that can be utilized by the SCR downstream. Further reduction of NOx occurs at the SCR catalyst and depends on the NO2/NOx ratio entering the SCR catalyst 152.

As mentioned above, during low temperature operation, such as city driving, conversion efficiency in the SCR catalyst can remain relatively low. In this embodiment, SCR takes place upstream in the exhaust system. Due to first heat device 158, the temperature of the exhaust gas flowing into first catalyst device 80 may be increased, thus increasing the temperature in the SCR catalyst and improving conversion efficiency. Additional components may contribute to temperature control for improved conversion efficiency as explained in further detail below.

Second heat device 154 is arranged at outlet 160 of first catalyst device 80. Second heat device 154 is covered by the SCR catalyst 152, i.e., by a corresponding coating. The heat devices may be operated electrically but, as an alternative, can also use other energy sources.

Feed device 84 is arranged in spatial proximity to outlet 160 of first catalyst device 80. By virtue of feed device 84, a reducing agent or a solution of a substance which is converted catalytically into a reducing agent, is introduced from a corresponding reservoir (not shown) into exhaust tract 48, thus allowing the solution to be fed directly onto outlet 160. From here, the solution may enter into contact with SCR catalyst 152 and/or optional hydrolysis catalyst arranged there.

Feed device 84 may be designed as an injection device but can also comprise other advantageous designs for introducing a substance, ideally a liquid or an aqueous solution. The urea in said solution is converted thermolytically and hydrolytically into ammonia. As one option, the agent AdBlue is used. As an alternative, it is also possible for ammonia in the gaseous state to be introduced directly if it is made available in this form; however, this is not the conventional practice.

Mixer 136 is arranged in exhaust tract 48 between first catalyst device 80 and second catalyst device 82, in immediate spatial proximity to the outlet 160 of the first catalyst device 80. Mixer 136 is advantageously used for mixing the injected reducing agent with exhaust gas, thus avoiding deposits in the exhaust tract, especially in the case of urea. Furthermore, the mixer enables reducing agent to be fed in at the outlet of the first catalyst unit, thus ensuring that it is available there for reducing nitrogen oxides over the SCR catalyst.

As mentioned above, to reduce exhaust gas emissions via SCR, NOx is further reduced by NH3 through active dosing of urea solution (AdBlue). At low temperatures, the conversion efficiency of urea to NH3 is low. At high temperatures, injection of urea solution onto a warm surface with a hydrolysis catalyst (such as SCR catalyst) can further improve the process. Thus, rear-injection onto a warm SCR catalyst 152, as opposed to injection downstream, may be advantageous for conversion. The surface of SCR catalyst 152 may be heated through exhaust flowing into the first catalyst device 80 from exhaust tract 48. Additional heating may be achieved at a higher rate through first heat device 158 and second heat device 154. In addition, the rear face of first catalyst device 148—containing second heat device 154—may be coated with SCR coating (either copper, iron zeolite, or vanadium pentoxide based). This coating also has hydrolytic function, helping to decompose urea into NH3. Further, NH3 may store on first catalyst device 80, making it readily available for reaction with NOx leaving oxidation catalyst 148.

Second catalyst device 82 is arranged in exhaust tract 48, downstream of first catalyst device 80. In particular, second catalyst device 82 contains SCR catalyst 156. As in first catalyst device 80, SCR catalysts may be composed of copper, iron zeoliths or vanadium pentoxide, for example. In addition, second catalyst device 82 may have an ammonia barrier catalyst in the outlet region (not shown), used to oxidize ammonia which is not consumed as a reducing agent for nitrogen oxides to ensure that this ammonia is not released into the environment.

In an alternative embodiment, a hydrolysis catalyst can also additionally be arranged in the first catalyst device 80 to ensure rapid hydrolysis of the urea (not shown), with the possibility of said hydrolysis catalyst to be arranged together with SCR catalyst 152 or alone there. As an alternative, however, it is also possible for the hydrolysis catalyst to be arranged in the exhaust tract between first catalyst device 80 and second catalyst device 82. In addition, it is also possible for a particulate filter (such as DPF 86 of FIG. 1) or other exhaust gas aftertreatment devices familiar to a person skilled in the art, e.g. a lean NOx trap (LNT), to be arranged in the first catalyst device 80.

NOx sensor 91 may be arranged downstream of first catalyst 80 and upstream of second catalyst 82, in exhaust gas tract 48 connecting the two catalyst devices.

A mixer 138 is furthermore arranged downstream, in the direction of the second catalyst device 82, in the exhaust tract 48. As with mixer 136, mixer 138 is advantageously used for uniform distribution of reducing agent introduced into the exhaust tract. It is also possible for just one mixer 136 to be present in the system. It is also possible for there to be no mixer in the system. The type and number of mixers depends on the system and on the requirements for ammonia distribution.

It is possible for there to be further catalyst devices in the system 70, and these can be arranged upstream of first catalyst device 80 and downstream of second catalyst device 82. First heat device 146 is then ideally arranged at the inlet of the catalyst device situated first in the corresponding arrangement. Second heat device 154 is then ideally arranged in spatial proximity to feed device 84.

Control system 115 is shown receiving information from a plurality of sensors 16 (various examples of which are described herein) and sending control signals to a plurality of actuators 81 (various examples of which are described herein). The control system 115 includes controller 12. The controller 12 may receive input data from the various sensors. For example, sensors 16 may include a sensor located upstream of first catalyst device 80 and may be used to detect the temperature of the exhaust entering first catalyst device 80 through inlet 158, such as sensor 87. As another example, sensors 16 may include a sensor placed in first catalyst device 14 for detection of heating of first catalyst device 80, such as sensor 88. As another example, sensors 16 may include a sensor located downstream of first catalyst device 80 for detection of exhaust gas temperature flowing from first catalyst device 80 to second catalyst device 82, such as sensor 90. As yet another example, sensors 16 may include a sensor located downstream of first catalyst device 80 for detection of latent nitrogen oxides missed by selective catalytic reduction, such as sensor 91. As a final example, sensors 16 may include a sensor to sense the temperature of exhaust gas exiting second catalyst device 82, such as sensor 92.

According to the embodiment in FIG. 2, the system 70 is a rectilinear or in line system. Other possible configurations of the system 70 have been considered such as an L shape, T shape or U shape. The catalysts can be based on ceramics or metal.

Figure 3:
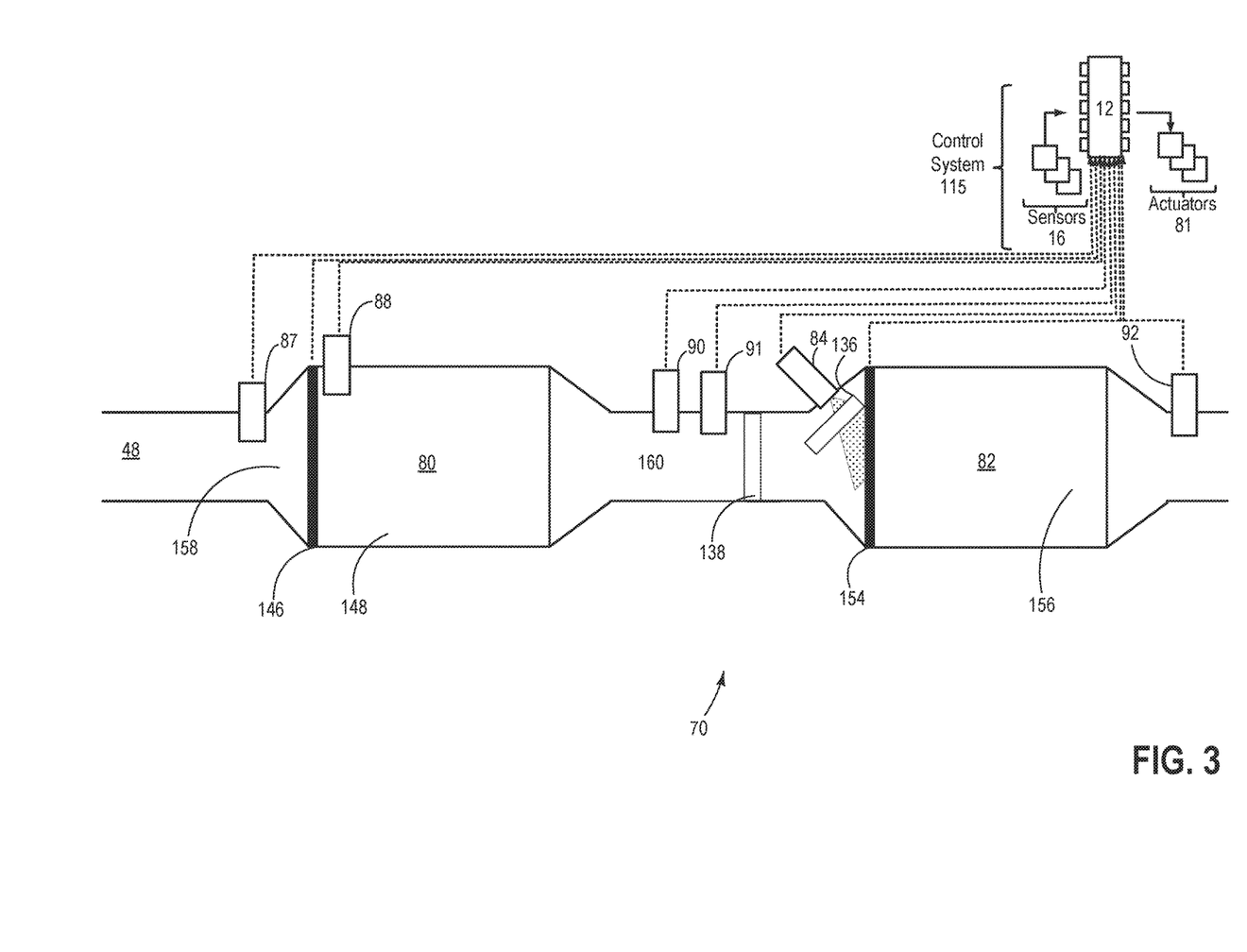
FIG. 3 shows a schematic diagram of an alternate embodiment of an exhaust gas aftertreatment system.

As an alternative, FIG. 3 shows a different embodiment of an exhaust gas aftertreatment system featuring second heat device 154 arranged in exhaust tract 48 between first catalyst device 80 and second catalyst device 82, i.e., directly ahead of the inlet of second catalyst device 82. Here, the hydrolysis catalyst and second heat device 154 can be in a combined arrangement with one another. In this case, there is no need for an SCR coating on outlet 160 of first catalyst device 80. However such a coating may be provided if there is an LNT in first catalyst device 80. Further, in contrast to the embodiment of FIG. 2, the aqueous urea solution is not fed directly onto outlet 160 but rather forward injected along the exhaust flow towards second catalyst device 82. In this way, the reducing agent is introduced through injection towards an inlet of the second catalyst in a direction of exhaust flow through the second catalyst.

If a LNT is arranged in first catalyst device 80, NOx during rich purge is mostly reduced over the LNT catalyst. The part of exhaust NOx that does exit the LNT can then be reduced over the downstream SCR catalyst.

Figure 4:
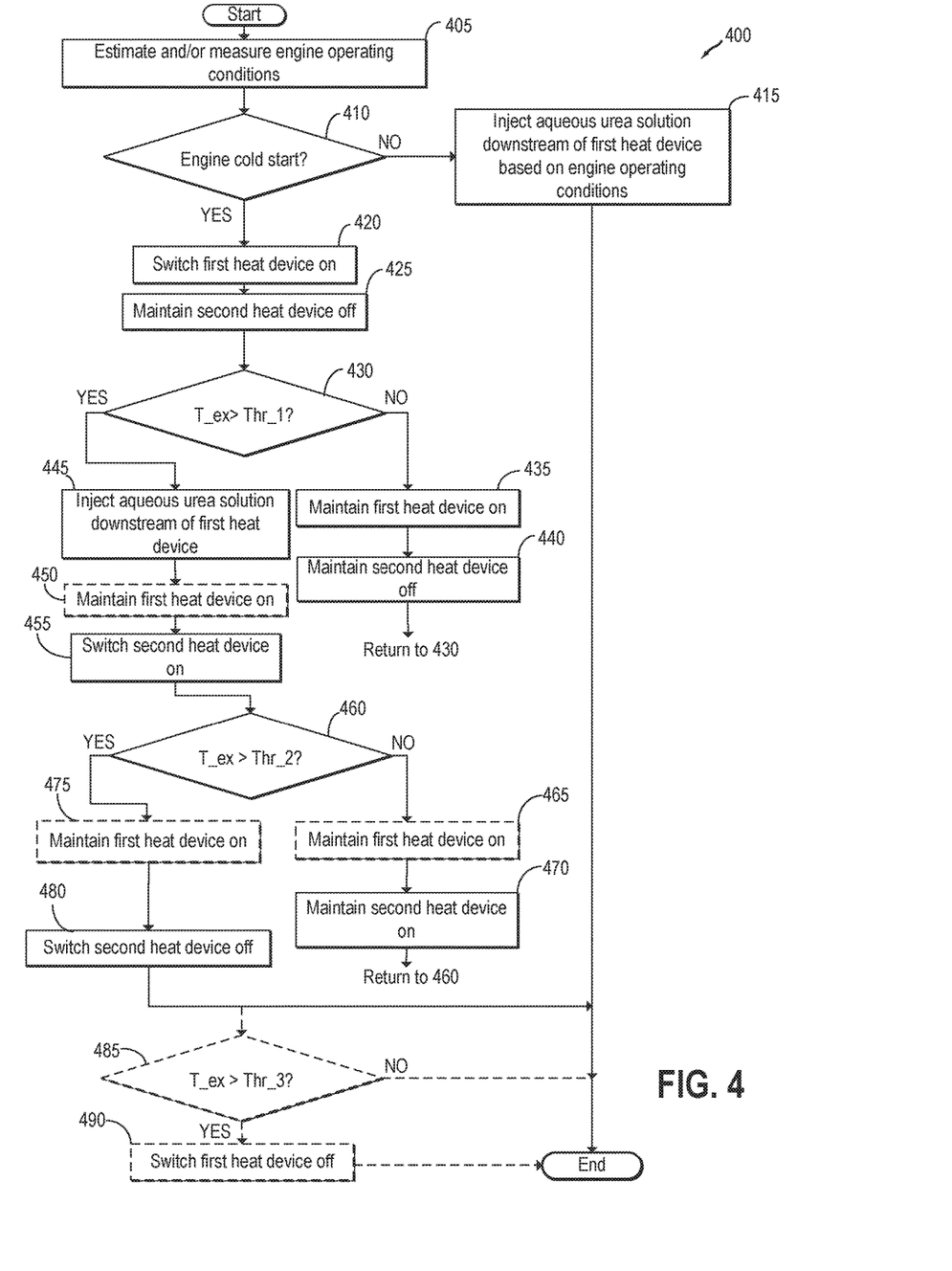
FIG. 4 shows a method for operating the exhaust gas aftertreatment system for the reduction of nitrogen oxides.

FIG. 4 shows a method for operating an exhaust gas aftertreatment system for the reduction of nitrogen oxides.

In FIG. 4, an example routine 400 is shown for heating of a dual catalyst system (such as first catalyst device 80 and second catalyst device 82 of FIG. 1) using heat devices (such as first heat device 146 and second heat device 154 of FIG. 1) in response to an engine cold start. The routine further incorporates selective catalytic reduction using, in one example, rear-injection of an aqueous urea solution during engine-on operating conditions.

Beginning at 405, the routine includes estimating and/or measuring engine operating conditions. The conditions estimated may include, for example, engine speed, torque demand, engine load, engine temperature, exhaust catalyst temperature, exhaust air-fuel ratio, boost demand, etc.

Routine 400 continues at 410 to determine whether the present conditions represent a cold engine starting condition. In one example, an engine cold-start condition is confirmed if the engine temperature or the ambient temperature at the engine start is below a threshold temperature. In one example, the threshold is a function of an exhaust catalyst light-off temperature. If it is determined that it is not an engine cold start, it may be inferred that the engine is sufficiently warm and the routine 400 moves on to 415. At 415, under warm engine conditions, routine 400 includes injecting a reducing agent, such as a urea solution, onto the first catalyst. In one example, the aqueous urea solution is rear injected downstream of a first heat device (such as onto the first catalyst) such that a direction of urea injection into the first catalyst is opposite a direction of exhaust flow through the first catalyst. In another example, the aqueous urea solution is front injected upstream of the first heat device (e.g., onto an inlet of the first brick) such that a direction of urea injection into the first catalyst is the same as the direction of exhaust flow through the first catalyst. In one example, the urea solution may be introduced via a feed device, such as feed device 84 of FIG. 1, into the exhaust tract downstream of the first catalyst. Exhaust from the warm engine heats up the first catalyst device as it flows there-through. Injection of the aqueous urea solution at the rear of the first catalyst device provides a warm surface for the reaction chain to proceed in an optimum manner. In addition, the rear injection of the reducing agent in a direction opposite to exhaust flow enables increased mixing of the exhaust with the reducing agent before the exhaust flows into the second catalyst where the reducing agent is used for selective catalytic reduction of the exhaust components. As a result, the catalytic treatment of exhaust emissions in the second catalyst is improved.

The amount of urea injected is based on operating conditions such as engine speed, torque demand, engine load, engine temperature, exhaust catalyst temperature, exhaust air-fuel ratio, boost demand, and inferred or estimated NH3 load on the SCR catalyst. The amount of urea may also be based on the NOx feed to the SCR catalyst (as measured by a NOx sensor or estimated via a model). As an example, the controller may determine the amount of urea for injection based on a calculation using a look-up table with the input being one or more of exhaust catalyst temperature, pre-SCR NOx level, and stored NH3 level, and the output being an amount of urea.

If an engine cold-start is confirmed, routine 400 proceeds to 420. At 420, a first heat device located at an upstream end of the first catalyst (such as first heat device 146 of FIG. 1) is switched on via a controller sending a signal to heat device actuator that switches on the device. Herein the first heat device is activated before a second heat device (located at a downstream end of the first device) in order to speed up the oxidation of carbon monoxide (CO), hydrocarbon (HC), and nitrogen oxide (NO) in the exhaust. In this way, the temperature of the first catalyst may be raised to a level where the first oxidation catalyst is activated. For example, the first heat device may be operated to raise a temperature of the first catalyst to or above 170° C. At 425, while the first device is operated, the second heat device (such as second heat device 154 of FIG. 1), is disabled. Specifically, while the first heat device is enabled, the second heat device is disabled. From this, it will be appreciated that in some examples, the first and second heat devices may be operated mutually exclusively.

At 430, it may be determined whether the temperature of the first catalyst is greater than a first threshold. In one example, the temperature of the first catalyst may be inferred based on the temperature of exhaust at an inlet or an outlet of the first catalyst. Alternatively, the temperature may be estimated by a temperature sensor coupled to the first catalyst (e.g., to the brick).

If the first temperature threshold is not reached, at 435, the routine includes maintaining the first heat device activated until the target temperature is reached. At 440, the second heat device remains deactivated. In this way, the temperature of the exhaust gas can be increased in a controlled manner.

If the first temperature threshold is reached (e.g., if the temperature is at or above 180° C.), routine 400 moves to 445 wherein a reducing agent is injected into the exhaust tract at the first catalyst. In one example, the injected reducing agent is aqueous urea solution. In an alternate example, the injected reducing agent is ammonia. The reducing agent may be introduced via a feed device, such as feed device 84 of FIGS. 1-3. In one example, the reducing agent is introduced via rear-injection. The feed device is positioned above the exhaust tract, at an outlet of the first catalyst device, with the injection nozzle pointed at an angle of the rear of the first catalyst device. As a result, the reducing agent is injected in a direction opposite of exhaust flow, as exhaust flows out of the outlet of the first catalyst device towards the second catalyst device. Optionally, the first device may remain on while the reducing agent is injected at 450. Also, responsive to the first temperature threshold being surpassed while the reducing agent is being injected, the second heat device is switched on at 455. As a result, rear-injection may take place on a warm surface of the SCR catalyst. The heating effect accelerates both thermolysis and hydrolysis of the urea, ensuring that the ammonia is available for reduction of the nitrogen oxides in the exhaust gas. In this process, the SCR catalyst also has a hydrolytic function and therefore supports the conversion of urea into ammonia. A certain quantity of ammonia can be stored in an SCR catalyst, ensuring that ammonia is available to reduce nitrogen oxides contained in the exhaust gas even in a first catalyst device, such as first catalyst device 80 of FIG. 1.

It will be appreciated that in some examples, the first and second heat devices may be operated mutually exclusively. That is, when the first temperature threshold is surpassed, the second heat device is turned on while the first heat device is turned off. Likewise, when below the first temperature threshold, the second heat device is maintained disabled while the first heat device is enabled.

In this way, by heating the first catalyst device and the exhaust gas to the first threshold during cold conditions, it may be better ensured that urea is converted more quickly into ammonia, and that the exhaust is well mixed with the ammonia before the ammonia-exhaust gas mixture is streamed to the second catalyst device (such as second catalyst device 82 of FIG. 1). This enables the ammonia to be available in a more usable form as a reducing agent at the downstream SCR catalyst, such as SCR catalyst 156 of FIG. 1. In addition, the injection of the reducing agent at the upstream catalyst and the resulting improved upstream mixing enables ammonia to be stored in the second, downstream SCR catalyst device. The excess ammonia can be oxidized at an ammonia barrier catalyst (or ammonia slip catalyst) arranged in the second catalyst device.

Routine 400 may continue to 460 to determine whether the temperature of the exhaust gas is continuously high enough to surpass a second temperature threshold. In one example, the temperature of the first catalyst may be inferred based on the temperature of exhaust at the inlet or the outlet of the first catalyst. Alternatively, the temperature may be estimated by a temperature sensor couple to the first catalyst. The second temperature threshold may represent an exhaust temperature above which the first catalyst is warm enough for the decomposition of the reducing agents and progress of SCR.

If the second temperature threshold is not reached, at 465, the routine includes maintaining the first heat device activated. Further, at 470, routine 400 includes maintaining the second heat device activated as well. In this way, both the first heat device and the second heat device remain activated until the target temperature is reached. By heating both ends of the first catalyst device, exhaust heating is ensured.

If the second temperature threshold is reached, (e.g., if the temperature is at or above 250° C.), at 475, the routine includes optionally maintaining the first heat device activated. In an alternate example, when the second temperature threshold is reached, the first heat device may be deactivated. Further, at 480, the second heat device may be deactivated. In this way, the temperature of the exhaust gas can be decreased in a controlled manner.

As used here, the exhaust temperature includes the temperature of the first catalyst. While this temperature is used for activation of the first heater, switching conditions for the second heater may be based on the second catalyst temperature. Moreover, the first heater may not necessarily need to be switched on immediately after the cold start. For example, there may be some minimum temperature Tmin1 above which the heater is switched on. For example, the switching condition for the first heater can include Tmin1<Tex1<Tmax1, while the switching condition for the second heater may include Tmin2<Tex2<Tmax2. Tex1 and Tex2 may be generic temperatures used for switching of the first and second heater respectively. They may be distinct from each other. Alternatively, they could be the same temperature in some examples.

Optionally, the exhaust temperature may be evaluated against a third temperature threshold at 485. The third temperature threshold may represent an exhaust gas temperature high enough to allow the first heat device to be switched off at 490. In this way, if the third temperature threshold is surpassed, i.e., if the exhaust gas is hot enough, both of the heat devices may be switched off. Further, to control the switching on and switching off of the first and second heat devices in accordance with the required or prevailing temperature, a control device (not shown) is arranged in the system. The control device may be similar to that of controller 115 of FIGS. 1-3. The control device is configured with computer readable instructions stored on non-transitory memory for: responsive to a temperature of exhaust at the first catalyst being lower than a first threshold, actuating the first heat device; and responsive to the temperature of exhaust at the first catalyst being higher than the first threshold, injecting an amount of the reducing agent and actuating the second device. Here, it is also possible for the heat devices to be switched on and off on the basis of a model. Control is furthermore dependent on parameters of the combustion engine, e.g., speed, fuel and exhaust gas mass flow. Routine 400 may end.

In this way, routine 400 may comprise; following an engine start, switching on a first heat device coupled to an inlet of a first catalyst, the first catalyst arranged upstream of a second catalyst in an exhaust passage; and when an exhaust temperature reaches a first temperature threshold value, introducing, via a feed device, a reducing agent into the exhaust passage between the first and second catalyst; and switching on a second heat device coupled to an outlet of the first catalyst.

Figure 5:
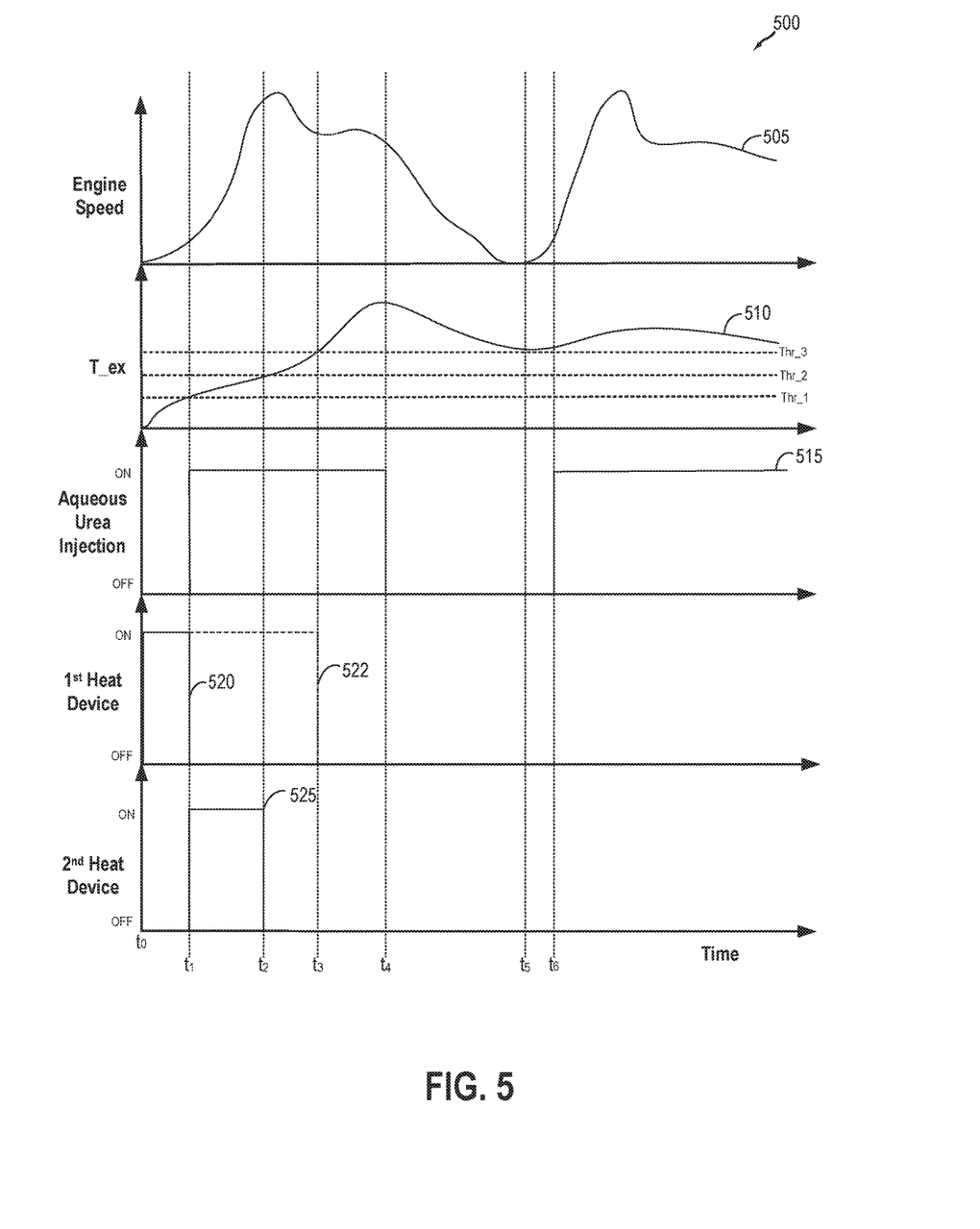
FIG. 5 shows an example map showing of operating the exhaust gas aftertreatment system for the reduction of nitrogen oxide.

An example map showing adjustments to the first and second heat devices based on exhaust temperature is now elaborated with reference to the example of FIG. 5.

Specifically, map 500 of FIG. 5 depicts changes in engine speed at plot 505, changes in temperature of the exhaust at 510, the adjustment of aqueous urea injection at 515, adjustments to the first heat device at 520, and adjustments to the second heat device at 525. As explained above, aftertreatment of exhaust gas may be limited by the temperature of the exhaust gas itself. Aftertreatment may include SCR for the reduction of nitrogen oxides by the reducing agent ammonia, in the form of the urea solution. The solution is injected via a feed device via a rear-face injection, downstream of the first catalyst device. Sufficiently high exhaust temperatures are needed for the decomposition of the reducing agents and the progress of the SCR. As the engine starts and stops, the temperature of the exhaust may fluctuate. Heat devices are used to warm the temperature of the exhaust gas and/or the catalyst brick to maintain temperatures high enough for optimal SCR conversion.

At t0, an engine start command is received (plot 505). Due to the ambient temperature being lower at this time, the engine start may be a cold-start and the temperature of the exhaust gas (plot 510) may not be high enough to activate the exhaust catalysts. Responsive to the engine start command, the engine is cranked and the first heating device is activated (plot 520) to increase oxidation time of CO, HC, and NO. The first heat device is coupled to an upstream end of a first exhaust catalyst device in the exhaust pipe. Activating the first heat device includes actuating a switch to flow current through the first heat device. The second heat device is maintained disabled at this time (plot 525) since operation of the first heat device is sufficient to raise the exhaust temperature. Also, aqueous urea injection is not enabled (plot 515) due to the exhaust temperature not being high enough.

Continuing with map 500, between t0 and t1, responsive to engine cranking, the engine speed begins to increase (plot 505). Further, in response to the activation of the first heat device (plot 520), the temperature of the exhaust increases (plot 510) towards a first threshold (Thr_1). Exhaust temperature also rises due to engine cylinder combustion. At t1, the exhaust temperature reaches the first threshold (Thr_1). Responsive to the rise in exhaust temperature, aqueous urea injection (plot 515) is activated at t1. This includes the controller sending a signal to a driver coupled to the urea injector to vary a pulse width of urea injection from the injector. Herein the urea injector is positioned downstream of the first catalyst such that the urea is injected via rear injection, towards a downstream end of the first catalyst, in a direction of flow opposite to the direction of exhaust flow through the first catalyst. This improves mixing of the reducing agent with exhaust gas. Also responsive to the exhaust temperature reaching the first threshold, the first heat device is disabled at t1 (plot 520). In an alternate example, the first heat device may continue to be activated (plot 522) after the first threshold is reached, such for the duration while aqueous urea injection is enabled.

Also in response to the exhaust temperature reaching the first threshold, a second heat device may be activated (plot 525). The second heat device is coupled to a downstream end of the first catalyst device, and is activated to further assist in the decomposition of urea, that was injected into the first catalyst device, into NH3. Further, by operating the second heat device, it may be better ensured that the exhaust is warm and mixed with the reducing agent as it flows to the downstream, second catalyst device, improving the catalytic treatment of exhaust emissions at the second catalyst.

In one example, as shown by solid lines 520 and 525, the first and second heat device are operated in a mutually exclusive manner with the second heat device disabled when the first heat device is enabled, and the second heat device enabled when the first heat device is disabled. However, in other examples, as shown by dashed line 522, the first and the second heat devices may be operated concurrently based on the amount of catalyst heating required.

Between t1 and t2, engine speed continues to increase (plot 505), with a corresponding increase in the exhaust temperature (plot 510) as engine combustion progresses. At t2, responsive to an increase in the exhaust temperature to a second temperature threshold (Thr_2), higher than the first threshold, the second heat device may be deactivated (plot 525). The second temperature threshold may represent a temperature of the exhaust high enough to support an SCR reaction in the second catalyst device. In embodiments where the first heat device was active, the first heat device may remain activated (plot 522) to maintain the exhaust temperature warm enough for catalyst activation. Reducing agent injection is continued during this time while a mixer coupled between the first and second catalyst operates to mix the injected reducing agent with exhaust flow before flowing a mixture of exhaust and reducing agent into the second catalyst.

It will be appreciated that the mixer is simply a passive device that is specially constructed such that the resulting flow dynamics leads to a well-mixed exhaust being received at the downstream catalyst. At t3, the temperature of the exhaust is warm enough to surpass a third temperature threshold (Thr_3). Responsive to the exhaust temperature exceeding a third temperature threshold, higher than each of the first and second temperature threshold, the first heat device may be disabled (522), if it had not been deactivated previously. The second heat device remains deactivated (plot 525). In this way, when the exhaust temperature reaches a third temperature threshold value, each of the first and the second heat device are switched off.

At t4, responsive to an engine shutdown command, fuel and urea injection is disabled and the engine speed starts to decline (plot 505). Responsive to a reduction in engine speed, the temperature of the exhaust begins to decline (plot 510).

At t5, an engine restart command is received, responsive to which the engine is cranked and fueling is resumed. Since this engine start was shortly after a previous shutdown, the exhaust temperature is already sufficiently high. Therefore at t6, urea injection is enabled to address exhaust emissions without requiring operation of either the first or the second heat device.

In this way, exhaust emissions compliance may be improved. By operating one or more of a heating device upstream of an oxidation catalyst and a heating device downstream of the oxidation catalyst based on exhaust temperature at the oxidation catalyst, the activation of both the oxidation catalyst and a downstream reduction catalyst may be better ensured. By concurrently rear-injecting a reducing agent towards a downstream end of the oxidation catalyst, the heated exhaust may be better mixed with the reducing agent before the mixture travels through the reduction catalyst. By expediting activation of the reduction catalyst and improving the mixing of the exhaust with the reducing agent, the efficiency of the reduction at the downstream catalyst is improved. Overall, catalyst activation is expedited and exhaust emissions quality is improved.

In one embodiment, an exhaust gas aftertreatment system for a combustion engine in a motor vehicle, the exhaust gas aftertreatment system comprises, an exhaust tract; a first catalyst device arranged in the exhaust tract; a second catalyst device arranged downstream of the first catalyst device in the exhaust tract; a feed device for injecting a reducing agent arranged in the first and second catalyst device; a first heat device arranged at an inlet of the first catalyst device and a second heat device arranged downstream of the first catalyst device; and a control device. In a first example of the exhaust gas aftertreatment system for the combustion engine in the motor vehicle further comprises wherein the second heat device is arranged at an outlet of the first catalyst device. A second example of the exhaust gas aftertreatment system for the combustion engine in the motor vehicle optionally includes the first example and further includes wherein the first heat device is coated with an oxidation catalyst. A third example of the exhaust gas aftertreatment system for the combustion engine in the motor vehicle optionally includes one or more or both of the first and second examples, and further includes wherein the second heat device is coated with one or more of a selective catalytic reduction catalyst and a hydrolysis catalyst. A fourth example of the exhaust gas aftertreatment system for the combustion engine of the motor vehicle optionally includes one or more or each of the first through third examples, and further includes wherein the second catalyst device comprises a catalyst for selective catalytic reduction and wherein the first catalyst device comprises a lean NOx trap. A fifth example of the exhaust gas aftertreatment system for the combustion engine of the motor vehicle optionally includes one or more or each of the first through fourth examples, and further includes comprising at least one mixer arranged between the first and second catalyst device. A sixth example of the exhaust gas aftertreatment system for the combustion engine of the motor vehicle optionally includes one or more or each of the first through fifth examples, and further includes wherein the control device is configured with computer readable instructions stored on non-transitory memory for: responsive to a temperature of exhaust at the first catalyst being lower than a first threshold, actuating the first heat device; and responsive to the temperature of exhaust at the first catalyst being higher than the first threshold, injecting an amount of the reducing agent and actuating the second heat device. A seventh example of the exhaust gas aftertreatment system for the combustion engine of the motor vehicle optionally includes one or more or each of the first through sixth examples, and further includes comprising, responsive to the temperature of exhaust at the first catalyst being higher than a second threshold, the second threshold larger than the first threshold, deactivating each of the first and second heat device while continuing injection of the reducing agent.

In a second embodiment, a method comprises an exhaust gas aftertreatment including following an engine start, switching on a first heat device coupled to an inlet of a first catalyst, the first catalyst arranged upstream of a second catalyst in an exhaust passage; and when an exhaust temperature reaches a first temperature threshold value, introducing, via a feed device, a reducing agent into the exhaust passage between the first and second catalyst; and switching on a second heat device coupled to an outlet of the first catalyst. In a first example of the method, the method further comprises wherein when the exhaust temperature reaches a second temperature threshold value, switching off the second heat device and continuing introduction of the reducing agent, wherein the second temperature threshold value is higher than the first temperature threshold value. A second example of the method optionally includes the first example, and further includes wherein the first heat device is switched off when the second heat device is switched on. A third example of the method optionally includes one or more or both of the first and second examples, and further includes when the exhaust temperature reaches a third temperature threshold value, switching off each of the first and the second heat device, wherein the third temperature threshold value is higher than each of the first and second temperature threshold value. A fourth example of the method optionally includes one or more or each of the first through third examples, and further includes wherein the first catalyst includes one of an oxidation catalyst and a lean NOx trap, and wherein the second catalyst includes one of a selective reduction catalyst and a hydrolysis catalyst. A fifth example of the method optionally includes one or more or each of the first through fourth examples, and further includes comprising mixing the injected reducing agent with exhaust gas at a mixer arranged between the first and second catalyst. A sixth example of the method optionally includes one or more or each of the first through fifth examples, and further includes wherein introducing the reducing agent includes injecting the reducing agent towards and inlet of the second catalyst in a direction of exhaust flow through the second catalyst. A seventh example of the method optionally includes one or more or each of the first through sixth examples, and further includes wherein introducing the reducing agent includes injecting the reducing agent towards an inlet of the second catalyst in a direction of exhaust flow through the second catalyst.

In a third embodiment, a method comprises an engine exhaust including responsive to an engine cold-start condition, actuating a first heater coupled to an inlet of a first exhaust oxidation catalyst to raise an exhaust temperature, the first catalyst arranged upstream of a second selective reduction catalyst; and responsive to the exhaust temperature exceeding a first threshold, actuating a second heater coupled to an outlet of the first exhaust oxidation catalyst while injecting an amount of reducing agent, rearwards, onto the outlet of the first catalyst, a direction of the injecting opposite to the direction of exhaust flow. In a first example of the method, the method further comprises wherein while actuating the second heater, disabling the first heater. A second example of the method optionally includes the first example, and further includes wherein responsive to the exhaust temperature exceeding a second threshold, higher than the first threshold, disabling at least the second heater; continuing injecting of the reducing agent; and mixing the injected reducing agent with exhaust flow at a mixer coupled between the first and second catalyst before flowing a mixture of exhaust and reducing agent into the second catalyst. A third example of the method optionally includes wherein responsive to the exhaust temperature exceeding a third threshold, higher than the second threshold, disabling the first heater.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

It will be appreciated by those skilled in the art that although the invention has been described by way of example, with reference to one or more examples, it is not limited the disclosed examples and that other examples may be constructed without departing form the scope of the invention, as defined by the appended claims.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for exhaust gas aftertreatment of a combustion engine in a motor vehicle, comprising:
   an exhaust tract;

a first catalyst device arranged in the exhaust tract;
a second catalyst device arranged downstream of the first catalyst device in the exhaust tract;
a feed device for injecting a reducing agent arranged in between the first and second catalyst devices;
a first heat device arranged at an inlet of the first catalyst device and a second heat device arranged downstream of the first catalyst device; and
a control device, wherein the control device is configured with computer readable instructions stored on non-transitory memory for:
responsive to a temperature of exhaust at the first catalyst being lower than a first threshold, actuating the first heat device; and
responsive to the temperature of exhaust at the first catalyst being higher than the first threshold, injecting an amount of the reducing agent and actuating the second heat device.

2. The system of claim 1, wherein the second heat device is arranged at an outlet of the first catalyst device.

3. The system of claim 1, wherein the first heat device is coated with an oxidation catalyst.

4. The system of claim 1, wherein the second heat device is coated with one or more of a selective catalytic reduction catalyst and a hydrolysis catalyst.

5. The system of claim 1, wherein the second catalyst device comprises a catalyst for selective catalytic reduction and wherein the first catalyst device comprises a lean NOx trap.

6. The system of claim 1, further comprising at least one mixer arranged between the first and second catalyst devices.

7. The method of claim 1, further comprising, responsive to the temperature of exhaust at the first catalyst being higher than a second threshold, the second threshold larger than the first threshold, deactivating each of the first and second heat devices and continuing injection of the reducing agent.

8. A method for exhaust gas aftertreatment, comprising:
following an engine start,
switching on a first heat device coupled to an inlet of a first catalyst, the first catalyst arranged upstream of a second catalyst in an exhaust passage; and
when an exhaust temperature reaches a first temperature threshold value,
introducing, via a feed device, a reducing agent into the exhaust passage between the first and second catalysts; and
switching on a second heat device coupled to an outlet of the first catalyst.

9. The method of claim 8, further comprising, when the exhaust temperature reaches a second temperature threshold value, switching off the second heat device and continuing introduction of the reducing agent, wherein the second temperature threshold value is higher than the first temperature threshold value.

10. The method of claim 8, wherein the first heat device is switched off when the second heat device is switched on.

11. The method of claim 8, further comprising, when the exhaust temperature reaches a third temperature threshold value, switching off each of the first and second heat devices, wherein the third temperature threshold value is higher than each of the first and second temperature threshold values.

12. The method of claim 8, wherein the first catalyst includes one of an oxidation catalyst and a lean NOX trap, and wherein the second catalyst includes one of a selective reduction catalyst and a hydrolysis catalyst.

13. The method of claim 11, further comprising mixing the injected reducing agent with exhaust gas at a mixer arranged between the first and second catalysts.

14. The method of claim 8, wherein introducing the reducing agent includes injecting the reducing agent towards an outlet of the first catalyst in a direction opposite to a direction of exhaust flow through the first catalyst.

15. The method of claim 8, wherein introducing the reducing agent includes injecting the reducing agent towards an inlet of the second catalyst in a direction of exhaust flow through the second catalyst.

16. A method for an engine exhaust, comprising:
responsive to an engine cold-start condition,
actuating a first heater coupled to an inlet of a first exhaust oxidation catalyst to raise an exhaust temperature, the first catalyst arranged upstream of a second selective reduction catalyst; and
responsive to the exhaust temperature exceeding a first threshold,
actuating a second heater coupled to an outlet of the first exhaust oxidation catalyst while injecting an amount of reducing agent, rearwards, onto the outlet of the first catalyst, a direction of the injecting opposite to a direction of exhaust flow.

17. The method of claim 16, further comprising, while actuating the second heater, disabling the first heater.

18. The method of claim 16, further comprising, responsive to the exhaust temperature exceeding a second threshold, higher than the first threshold, disabling at least the second heater; continuing injecting of the reducing agent; and mixing the injected reducing agent with exhaust flow at a mixer coupled between the first and second catalysts before flowing a mixture of exhaust and reducing agent into the second catalyst.

19. The method of claim 18, further comprising, responsive to the exhaust temperature exceeding a third threshold, higher than the second threshold, disabling the first heater.

* * * * *